(12) United States Patent
Otake

(10) Patent No.: US 12,260,287 B2
(45) Date of Patent: Mar. 25, 2025

(54) WIRELESS TAG READING DEVICE

(71) Applicant: Toshiba Tec Kabushiki Kaisha, Tokyo (JP)

(72) Inventor: Atsushi Otake, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/322,136

(22) Filed: May 23, 2023

(65) Prior Publication Data

US 2023/0297791 A1 Sep. 21, 2023

Related U.S. Application Data

(63) Continuation of application No. PCT/JP2021/046071, filed on Dec. 14, 2021.

(30) Foreign Application Priority Data

Feb. 17, 2021 (JP) .................................. 2021-023200

(51) Int. Cl.
*G06K 7/10* (2006.01)

(52) U.S. Cl.
CPC .............................. *G06K 7/10386* (2013.01)

(58) Field of Classification Search
CPC .. G06K 7/10386; G06K 7/10; G06K 7/10297; G06K 7/10316; G06K 7/10366; G07G 1/00; G07G 1/0081
See application file for complete search history.

(56) References Cited

U.S. PATENT DOCUMENTS

| | | | | |
|---|---|---|---|---|
| 6,708,887 B1 * | 3/2004 | Garrett | ............... | G06K 7/10881 235/472.01 |
| 7,857,226 B2 * | 12/2010 | Mangaroo | .......... | G06K 7/10881 235/472.01 |
| 8,567,682 B2 * | 10/2013 | Boyd | .................. | G06K 7/1098 235/472.01 |
| 8,770,539 B1 * | 7/2014 | Hsu | ........................ | F16M 13/04 248/688 |
| 9,436,226 B2 * | 9/2016 | Chen | .................. | G06K 7/10881 |
| 10,177,799 B2 * | 1/2019 | Brownlow | ............. | H04B 1/385 |

(Continued)

FOREIGN PATENT DOCUMENTS

| | | | |
|---|---|---|---|
| JP | 2004-280414 A | 10/2004 | |
| JP | 2008-234634 A | 10/2008 | |

(Continued)

OTHER PUBLICATIONS

International Search Report (ISR) and Written Opinion mailed Mar. 15, 2022 in International Application No. PCT/JP2021/046071, with Translation of the ISR, 9 pages.

(Continued)

*Primary Examiner* — Sonji N Johnson
(74) *Attorney, Agent, or Firm* — Kim & Stewart LLP

(57) ABSTRACT

A wireless tag reading device includes: a reader that receives tag information transmitted from a wireless tag attached to an article; a first engagement portion provided in the reader; and a handle portion detachable from the first engagement portion. The handle portion further includes a second engagement portion detachable from the first engagement portion, and a gripper detachable from the second engagement portion.

5 Claims, 7 Drawing Sheets

(56) References Cited

U.S. PATENT DOCUMENTS

| | | | | |
|---|---|---|---|---|
| 2007/0165384 A1* | 7/2007 | Vejnar | .................... | G06F 9/454 312/294 |
| 2010/0018006 A1 | 1/2010 | Mangaroo et al. | | |
| 2017/0271829 A1 | 9/2017 | Kang et al. | | |

FOREIGN PATENT DOCUMENTS

| | | | | |
|---|---|---|---|---|
| JP | 2012-068748 A | 4/2012 | | |
| JP | 2013-054639 A | 3/2013 | | |
| JP | 2014-013652 A | 1/2014 | | |
| JP | 2018-159975 A | 10/2018 | | |
| KR | 101610023 B1 | 4/2016 | | |
| WO | WO-2021157784 A1 * | 8/2021 | ........... | G06K 7/0004 |

OTHER PUBLICATIONS

Notice of Reasons for Refusal (Office Action) mailed Oct. 15, 2024 in Japanese Patent Application No. 2021-023200 with English machine translation, 6 pages.

Request for the Submission of an Opinion (Office Action) mailed Jan. 21, 2025 in Korea Patent Application No. 10-2023-7017209 with English machine translation, 9 pages.

* cited by examiner

WIRELESS TAG READING DEVICE

CROSS-REFERENCE TO RELATED APPLICATIONS

This application is a continuation application of International Application No. PCT/JP2021/046071, filed Dec. 14, 2021, which designates the United States, and which claims the benefit of priority from Japanese Patent Application No. 2021-023200, filed Feb. 17, 2021, the entire contents of which are incorporated herein by reference.

FIELD

An embodiment of the present invention relates to a wireless tag reading device.

BACKGROUND

Recently, wireless tag reading devices for reading a wireless tag attached to an article such as a product have been used in a store, such as a supermarket and a mass merchandise store, a distribution warehouse, and the like. In a case of a store, a wireless tag reading device reads information on an article to be purchased from the wireless tag. Furthermore, in the case of a store, a wireless tag attached to a product displayed on a shelf or the like is read when inventory of products is taken. Furthermore, in a case of a warehouse, a wireless tag attached to an article is read in order to check the number of stock of articles stored in the warehouse.

Such a wireless tag reading device includes a handheld wireless tag reading device with a handle. During operation of the handheld wireless tag reading device, its handle is being held.

Meanwhile, recently, there has been a demand for using the wireless tag reading devices for various applications in various places. For example, a wireless tag reading device may be used after fixed. In such a case, the handheld wireless tag reading device may fail to be used for various applications due to a distracting handle.

It is thus preferable to provide a handheld wireless tag reading device that can be used for various applications.

DETAILED DESCRIPTION

According to one embodiment, a wireless tag reading device of an embodiment comprising: a reader that receives tag information transmitted from a wireless tag attached to an article; a first engagement portion provided in the reader; and a handle portion detachable from the first engagement portion.

A wireless tag reading device of an embodiment will be described below with reference to the drawings. Note that, in the embodiment, a product sold in a store will be described as one example of an article. Furthermore, the embodiment does not limit the invention.

A wireless tag reading device 1 of the embodiment is used to grasp the number of products in stock in, for example, a distribution warehouse. Furthermore, the wireless tag reading device 1 is used in inventory of products in, for example, a store. The wireless tag reading device 1 transmits a radio wave from a built-in antenna (not illustrated), and receives tag information (response radio wave) including information on a product from a wireless tag attached to the product, which has received the radio wave, with the antenna to collect information on the number of products in stock and the like.

The wireless tag reading device 1 of the embodiment is a so-called handheld device with a handle. The wireless tag reading device 1 receives tag information while being moved up and down and right and left with the handle being held.

Figure 1:
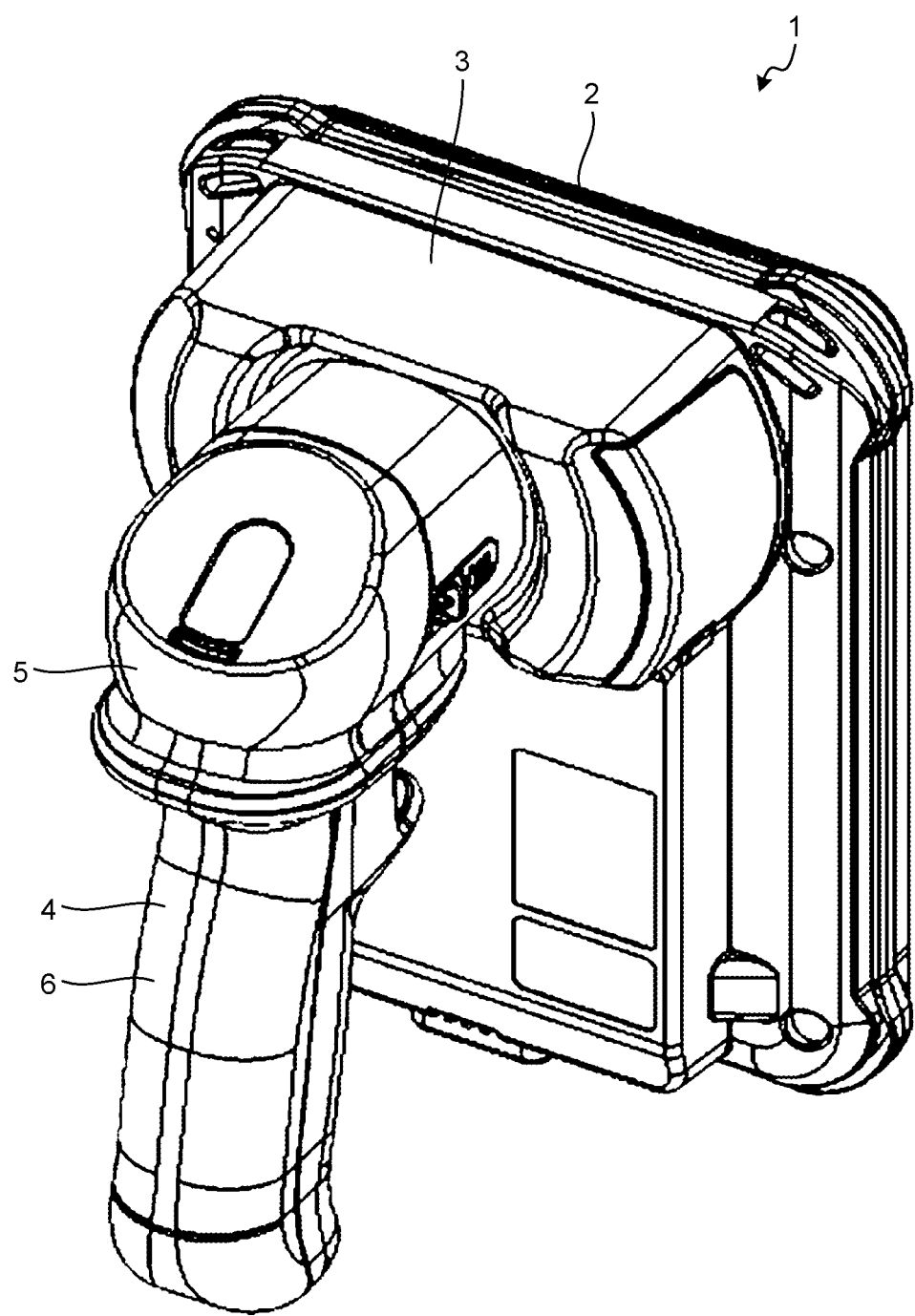
FIG. 1 is a perspective view illustrating a wireless tag reading device according to an embodiment.

A configuration of the wireless tag reading device 1 will now be described. FIG. 1 is a perspective view of the wireless tag reading device 1 according to the embodiment as viewed diagonally from behind.

As illustrated in FIG. 1, the wireless tag reading device 1 includes a reader 2, a first engagement portion 3, and a handle portion 4. The reader 2 includes an antenna, a controller, and a power supply unit (all not illustrated). The antenna transmits a radio wave to a wireless tag, and receives tag information from the wireless tag. The controller generates a radio wave transmitted by the antenna, and imports and analyzes the received tag information. The power supply unit drives the antenna and the controller.

The first engagement portion 3 is fixed to the reader 2, or integrated with the reader 2. The first engagement portion 3 engages the reader 2 and the handle portion 4 with each other. The first engagement portion 3 will be described later with reference to FIG. 3.

The handle portion 4 is attached to the reader 2 by being engaged with the first engagement portion 3. The handle portion 4 is gripped when the wireless tag reading device 1 is operated. An operator holds the handle portion 4 and moves the reader 2 up and down and right and left to collect tag information of a wireless tag attached to a product with the wireless tag reading device 1. The handle portion 4 includes a second engagement portion 5 and a gripper 6. The second engagement portion 5 and the gripper 6 will be described later with reference to FIG. 4.

Figure 2:
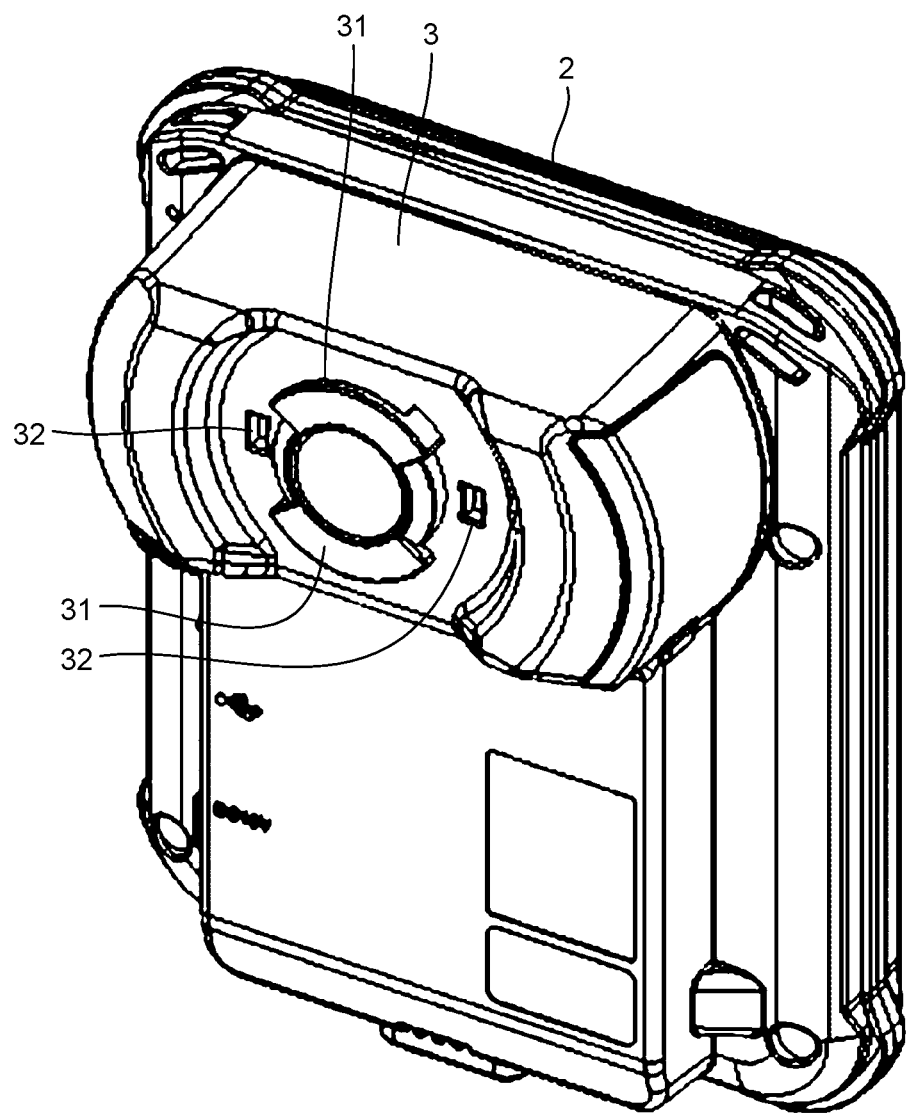
FIG. 2 is a perspective view illustrating a reading device and a first engagement portion of the wireless tag reading device.

FIG. 2 is a perspective view illustrating the reader 2 and the first engagement portion 3 of the wireless tag reading device 1. FIG. 2 illustrates a state in which the handle portion 4 is detached from the wireless tag reading device 1 in FIG. 1. As illustrated in FIG. 2, the first engagement portion 3 includes first engagement pieces 31. The first engagement pieces 31 have an arc shape. Two first engagement pieces 31 face each other at a position where the handle portion 4 (specifically, second engagement portion 5) is engaged. Specifically, the first engagement pieces 31 engage with second engagement pieces 51 to be described later, which engages the first engagement portion 3 and the second engagement portion 5 with each other.

Figure 3:
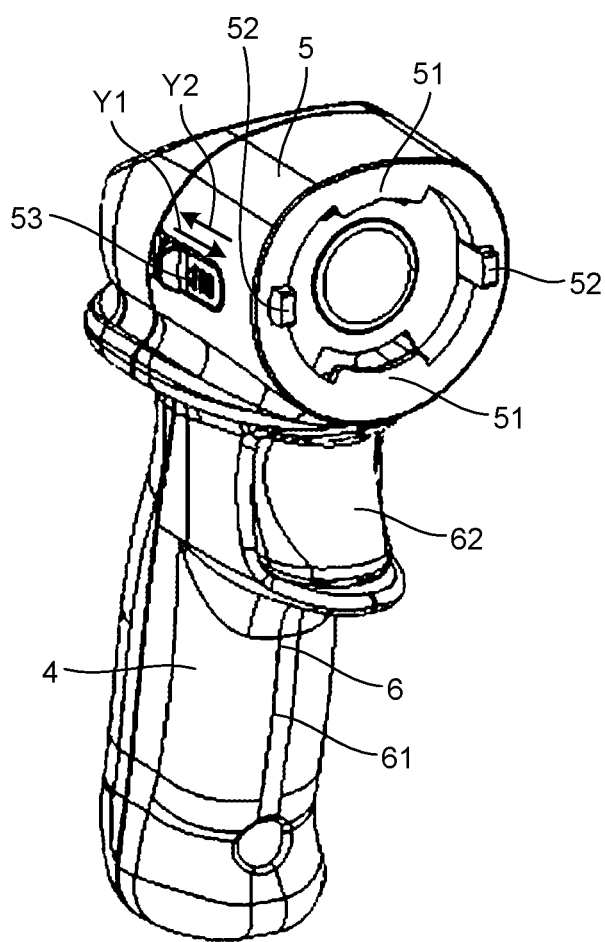
FIG. 3 is a perspective view illustrating a handle portion of the wireless tag reading device.

Furthermore, the first engagement portion 3 has engagement holes 32. Two engagement holes 32 face each other at a position shifted by approximately 90° from the position where the first engagement pieces 31 are provided in the first engagement portion 3. Engagement protrusions 52 to be described later with reference to FIG. 3 are fitted and engaged with the engagement holes 32. The engagement holes 32 are used for attaching and fixing the handle portion 4 to the first engagement portion 3.

FIG. 3 is a perspective view of the handle portion 4 of the wireless tag reading device 1. The handle portion 4 is detachable from the first engagement portion 3 (i.e., reader 2). FIG. 3 illustrates the handle portion 4 in a state of being detached from the first engagement portion 3.

The handle portion 4 includes the second engagement portion 5 and the gripper 6. The second engagement portion 5 and the gripper 6 are detachable from each other. FIG. 3 illustrates the handle portion 4 in a state where the second engagement portion 5 and the gripper 6 are connected (gripper 6 is attached to second engagement portion 5).

The second engagement portion 5 is detachable from the first engagement portion 3. The second engagement portion 5 includes second engagement pieces 51. The second engagement pieces 51 have an arc shape. Two second engagement pieces 51 face each other at a position where the first engagement portion 3 is engaged.

Furthermore, in the second engagement portion 5, the two engagement protrusions 52 face each other at a position other than that of the second engagement pieces 51. The engagement protrusions 52 can protrude from and retract into the second engagement portion 5. The engagement protrusions 52 are biased by a spring (not illustrated), and normally protrude from the second engagement portion 5. Furthermore, the second engagement portion 5 includes a slide portion 53. The slide portion 53 can slide in an arrow Y1 direction and an arrow Y2 direction. The two engagement protrusions 52 are connected to the slide portion 53. The engagement protrusions 52 move in the arrow Y1 direction along with movement of the slide portion 53 in the arrow Y1 direction. The engagement protrusions 52 move in the arrow Y2 direction along with movement of the slide portion 53 in the arrow Y2 direction. As described above, the engagement protrusions 52 are normally biased in a protruding direction (i.e., arrow Y1 direction), so that the slide portion 53 is normally located at a position where the slide portion 53 moves in the arrow Y1 direction. When the slide portion 53 is moved in the arrow Y2 direction, the engagement protrusions 52 move in the arrow Y2 direction against biasing force of the spring. That is, when the slide portion 53 is moved in the arrow Y2 direction, the engagement protrusions 52 shift from a state of protruding from the second engagement portion 5 to a state of retracting into the second engagement portion 5 (state of retreating into second engagement portion 5).

Furthermore, the gripper 6 includes a grip portion 61 and an operation unit 62. The grip portion 61 is a place which an operator who operates the wireless tag reading device 1 actually grips in the gripper 6. The operation unit 62 is a switch for operating the wireless tag reading device 1. When the operator operates the operation unit 62 while gripping the grip portion 61, an operation of transmitting a radio wave from the antenna incorporated in the reader 2 and receiving tag information transmitted from the wireless tag is performed.

Next, attachment and detachment of the handle portion 4 to and from the first engagement portion 3 will be described. In this case, in the handle portion 4, the gripper 6 is attached to the second engagement portion 5. First, a case where the handle portion 4 is attached to the first engagement portion 3 will be described. The second engagement pieces 51 provided in the second engagement portion 5 are moved to positions where the first engagement pieces 31 of the first engagement portion 3 are not provided, and the second engagement portion 5 is pressed against the first engagement portion 3.

Figure 4:
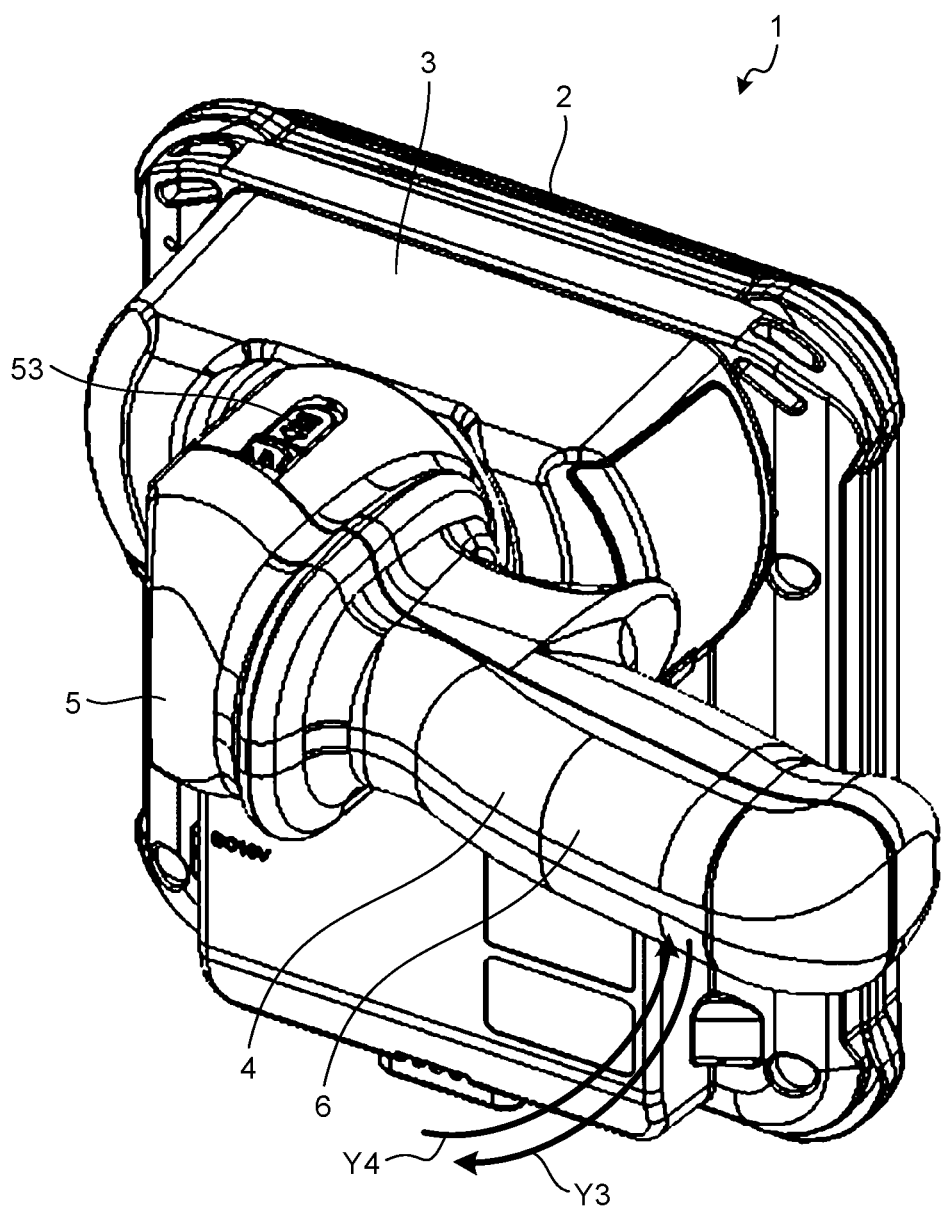
FIG. 4 is a perspective view in which a handle of the wireless tag reading device is rotated.

FIG. 4 illustrates a case where the second engagement pieces 51 provided in the second engagement portion 5 are moved to the positions where the first engagement pieces 31 of the first engagement portion 3 are not provided. In the state in FIG. 4, the engagement protrusions 52 does not protrude from the second engagement portion 5. When the gripper 6 is rotated in an arrow Y3 direction from this state, the second engagement portion 5 rotates with respect to the first engagement portion 3, and the second engagement pieces 51 enter the insides of the first engagement pieces 31. Then, the state in FIG. 1 is obtained by rotating the gripper 6 by approximately 90° in the arrow Y3 direction. In this state, the engagement protrusions 52 protrude by biasing force of the spring, and enter the engagement holes 32. The engagement protrusions 52 enter the engagement holes 32, which engages and fixes the first engagement portion 3 and the second engagement portion 5 to each other. In this manner, the handle portion 4 is attached to the first engagement portion 3.

Furthermore, when the handle portion 4 is detached from the first engagement portion 3, the slide portion 53 is moved in the arrow Y2 direction in FIG. 3 in the state in FIG. 1. The engagement protrusions 52 retreat into the second engagement portion 5 along with movement of the slide portion 53. Then, since the engagement between the engagement protrusions 52 and the engagement holes 32 is released, the second engagement portion 5 becomes rotatable with respect to the first engagement portion 3. When the grip portion 61 is gripped and the gripper 6 is rotated in an arrow Y4 direction in FIG. 4 in this state, the second engagement portion 5 is rotated by approximately 90° with respect to the first engagement portion 3 to be in the state in FIG. 4. In this state, the second engagement portion 5 can be detached from the first engagement portion 3. That is, the handle portion 4 can be detached from the first engagement portion 3.

As described above, in the wireless tag reading device 1 of the embodiment, the handle portion 4 can be detached from the first engagement portion 3 (i.e., reader 2). In a state where the handle portion 4 is attached to the first engagement portion 3 (state in FIG. 1), the operator grips the handle portion 4, and uses the wireless tag reading device 1 while moving the wireless tag reading device 1 up and down and right and left. In this case, the number of products in stock is checked in a distribution warehouse, or the number of products is checked when an inventory work is performed in a store.

Figure 5:
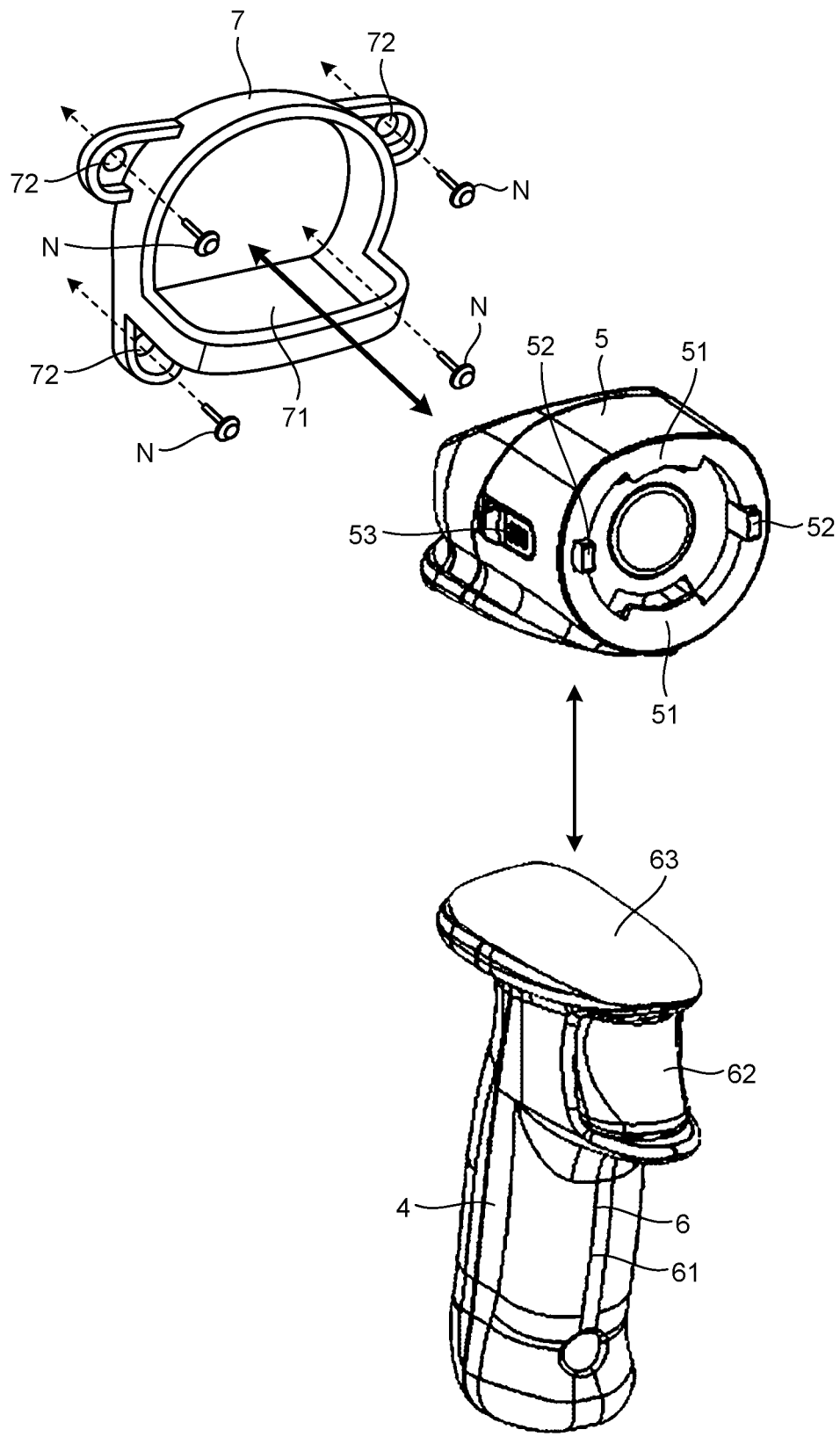
FIG. 5 is an exploded perspective view illustrating a first variation in which a second engagement portion is detached from the handle.

In contrast, the wireless tag reading device 1 of the embodiment may be used after detaching the gripper 6 from the second engagement portion 5. Hereinafter, a first variation in which the wireless tag reading device 1 is used after detaching the gripper 6 from the second engagement portion 5 will be described. The handle portion 4 can be disassembled into the second engagement portion 5 and the gripper 6. FIG. 5 is an exploded perspective view illustrating the first variation in which the second engagement portion 5 is detached from the handle portion 4 in the handle portion 4. The gripper 6 includes a fixing portion 63. The fixing portion 63 detachably fixes the second engagement portion 5. The second engagement portion 5 and the fixing portion 63 may be coupled to each other by, for example, a magnet, or may be fixed by fitting and locking the second engagement portion 5 into the fixing portion 63 by using a known coupling means. The second engagement portion 5 can be detached from the fixing portion 63 by releasing the lock.

Furthermore, the second engagement portion 5 detached from the fixing portion 63 is attached to a fixing member 7. The fixing member 7 has screw holes 72 at four corners of the fixing member 7. The screw holes 72 are screwed and fixed to a wall, a tool, and the like with screws N.

Next, the second engagement portion 5 from which the gripper 6 has been detached is attached to the fixed fixing member 7. For example, the second engagement portion 5 may be attached to the fixing member 7 by pressing the second engagement portion 5 into the fixing member 7. The second engagement portion 5 may be attached to the fixing member 7 by engaging the second engagement portion 5 with a receiving portion 71 or the like provided with the fixing member 7 by using a known means. Other attachment methods may be used.

The reader 2 can be attached to a wall, a tool, and the like by attaching the first engagement portion 3 provided in the reader 2 to the second engagement portion 5 attached to the fixing member 7 in this manner. The reader 2 according to the first variation attached to a wall, a tool, and the like in this manner receives tag information from a wireless tag attached to a product put in a basket or a cart for a customer to purchase mainly in a store. Since the reader 2 is fixed, a store clerk or the like can perform an operation of, for example, moving the product with both hands, and perform a registration operation related to the product based on the received tag information.

Furthermore, cashierless payment can be made in a store by providing the second engagement portion 5 and the reader 2 as described above such that the second engagement portion 5 and the reader 2 face a conveyor for flowing a product to be purchased and automatically receiving tag information of a wireless tag attached to the product.

Furthermore, in a store, a customer himself/herself can cause the tag information of a wireless tag attached to a product to be received by attaching the second engagement portion 5 and the reader 2 as described above to a shopping cart.

Furthermore, in a distribution warehouse, for example, when a product is loaded or unloaded, tag information can be received from a wireless tag attached to a product packed in a box, and the second engagement portion 5 and the reader 2 can be used as tunnel gates for receiving tag information from a wireless tag attached to a product conveyed by a conveyor by arranging one or a plurality of the second engagement portions 5 and the readers 2 as described above.

Figure 6:
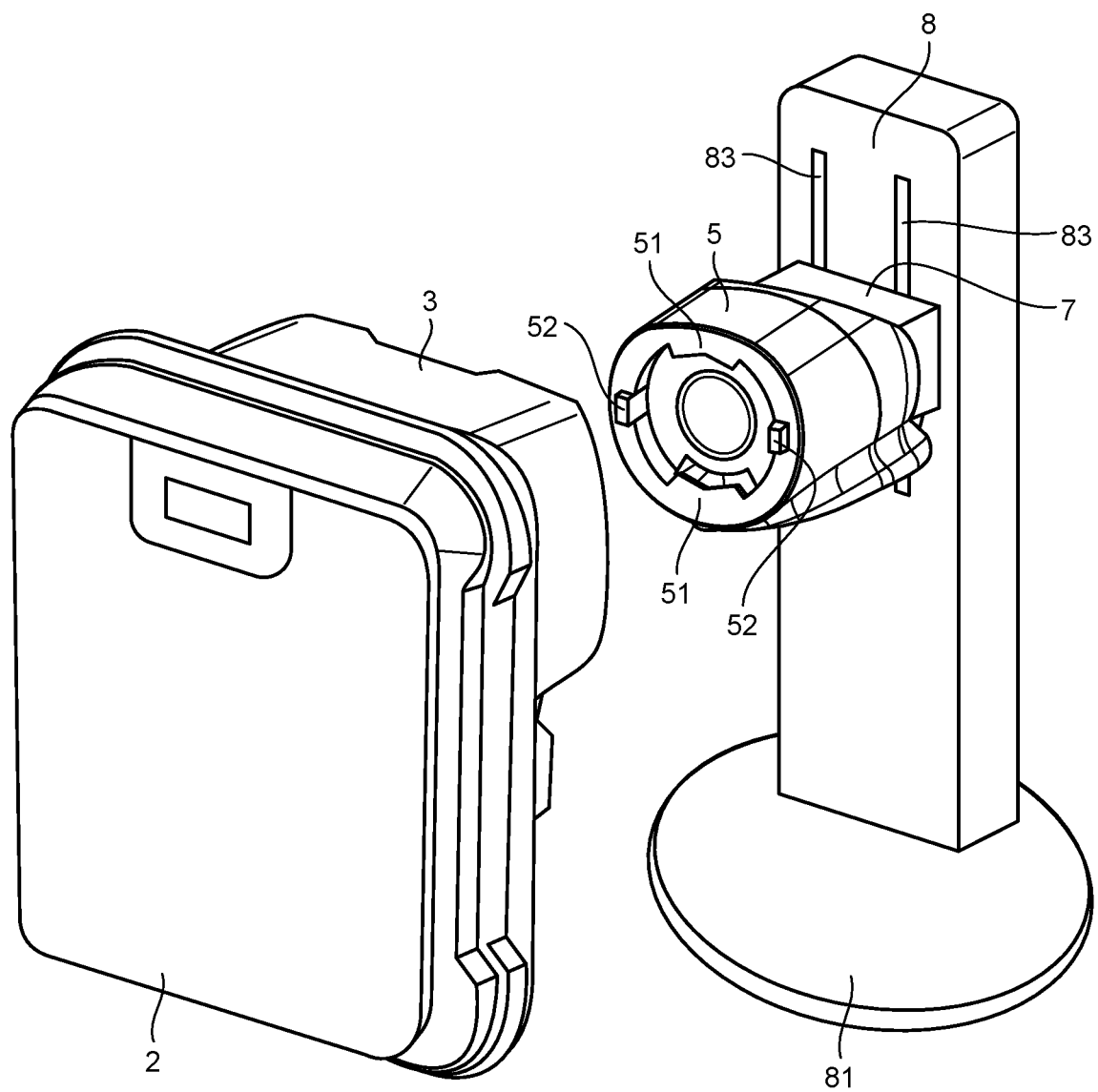
FIG. 6 illustrates a second variation in which the second engagement portion is attached to a support device.

Next, another mode (second variation) of the second engagement portion 5 and the reader 2 that operate in the mode as illustrated in FIG. 5 will be described. FIG. 6 illustrates the second engagement portion 5 attached to a support device 8 and the reader 2 (second variation). In FIG. 6, the support device 8 includes a leg 81 and a column 82. The leg 81 is a plate-like member that stably supports the support device 8. The column 82 is a columnar member that stands upward from the leg 81.

Furthermore, the fixing member 7 is attached to the column 82. The fixing member 7 is attached so as to be movable in an up and down direction along groove-shaped rails 83. Furthermore, the second engagement portion 5 is attached to the fixing member 7. The second engagement portion 5 is attached to the fixing member 7 by any of, for example, a method of pressing the second engagement portion 5 into the fixing member 7, for example, a method of engaging the second engagement portion 5 with the receiving portion 71 or the like provided with the fixing member 7, and, for example, other attachment methods, which are the same as the method described with reference to FIG. 5. In this manner, the reader 2 is attached to the support device 8 by attaching the first engagement portion 3 provided in the reader 2 to the second engagement portion 5 attached to the fixing member 7.

Note that, in the second variation, the orientation of the second engagement portion 5 can be desirably changed in a horizontal direction with respect to the fixing member 7. Such configuration allows the reader 2 attached to the second engagement portion 5 to oscillate to any position in a right and left direction.

In the second variation as described above, the reader 2 receives tag information from a wireless tag attached to a product put in a basket or a cart for a customer to purchase mainly in a store. Since the reader 2 is fixed, a store clerk or the like can perform an operation of, for example, moving the product with both hands, and perform a registration operation related to the product based on the received tag information. In the second variation, the second engagement portion 5 can be moved up and down and fixed to a position where an operation is easily performed in accordance with, for example, the height of an operator. Furthermore, the reader 2 can be directed to any position in the right and left direction for easy operation of the operator. Furthermore, the second engagement portion 5 and the reader 2 as described above can also be used for table inspection.

Figure 7:
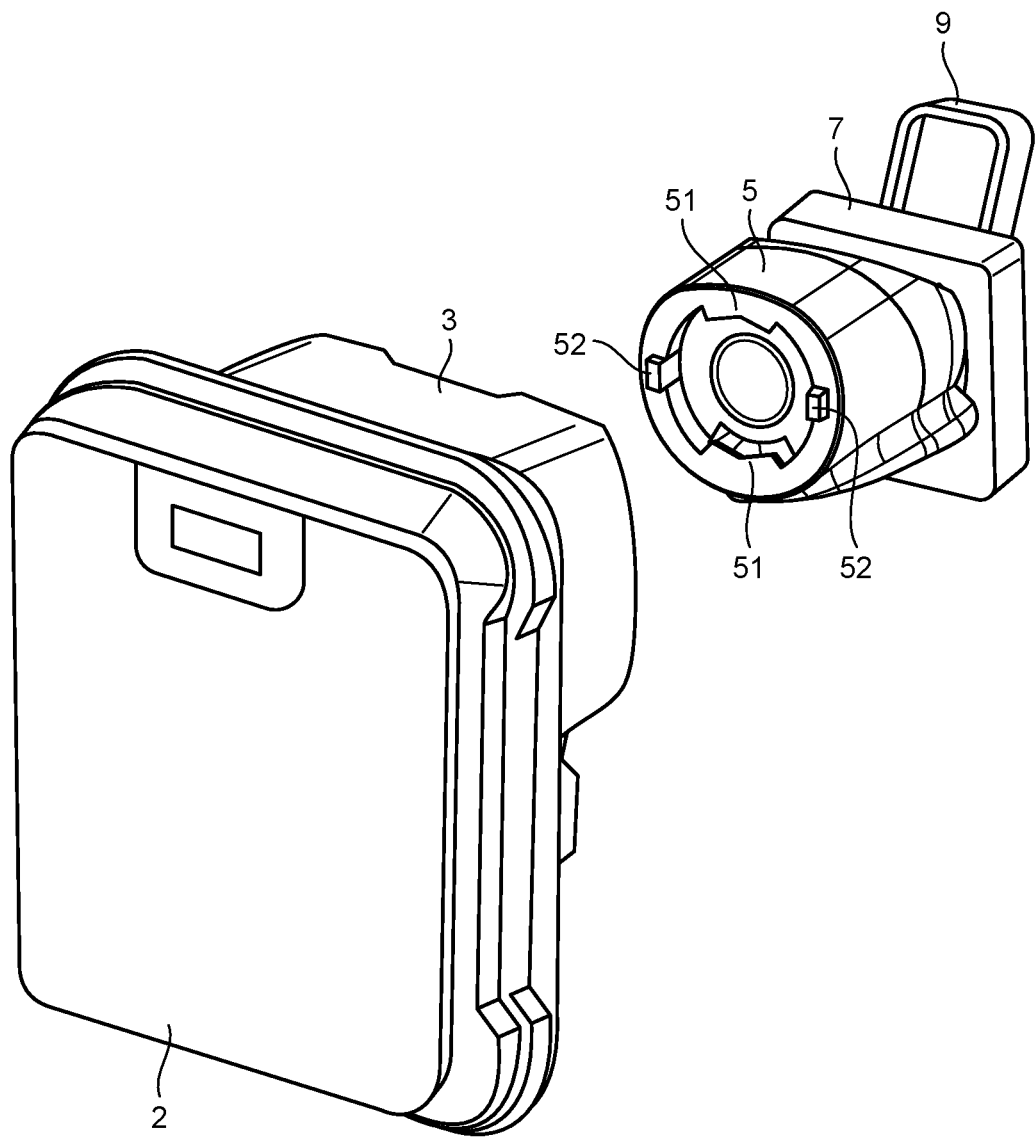
FIG. 7 illustrates a third variation in which the second engagement portion is attached to a clip.

Next, still another mode (third variation) of the reader 2 that operate in the mode as illustrated in FIG. 5 will be described. FIG. 7 illustrates the second engagement portion 5 attached to a clip 9 and the reader 2. The clip 9 can be put in any place by force of a spring.

The fixing member 7 is fixed to the clip 9. The second engagement portion 5 is attached to the fixing member 7. The second engagement portion 5 is attached to the fixing member 7 by any of, for example, a method of pressing the second engagement portion 5 into the fixing member 7, for example, a method of engaging the second engagement portion 5 with the receiving portion 71 or the like provided with the fixing member 7, and, for example, other attachment methods, which are the same as the method described with reference to FIG. 5. The reader 2 can be attached to the clip 9 by attaching the first engagement portion 3 provided in the reader 2 to the second engagement portion 5 attached to the fixing member 7 in this manner.

In the third variation as described above, the reader 2 is attached to a box and a container by putting the clip 9 to which the reader 2 is attached in, for example, the box and the container for packing a product. Then, tag information is received from a wireless tag attached to the product to be packed. Information on the packed product can be grasped by such a way.

The wireless tag reading device 1 according to the embodiment, the first variation, the second variation, and the third variation have been described above. Here, the wireless tag reading device 1 needs to receive tag information from a product located relatively far away, and thus the wireless tag reading device 1 needs to transmit a radio wave having a relatively strong radio wave intensity from an antenna so that the radio wave reaches a distant place. In constant, in the first variation, the second variation, and the third variation, tag information is received from a product located relatively nearby, so that a radio wave transmitted from the antenna is not required to have so strong intensity. A strong radio wave may cause erroneous reading in which tag information on a product packed in another box is also received. Therefore, the intensity of a transmitted radio wave is desirably changed between the case of the wireless tag reading device 1 and the cases of the first variation, the second variation, and the third variation.

For this reason, in the embodiment, the intensity of a radio wave transmitted from an antenna is changed depending on whether the gripper 6 is attached to or detached from the second engagement portion 5 (i.e., whether the wireless tag reading device 1 is used while being moved up and down and right and left with the gripper 6 being held, or whether used as the first variation, the second variation, and the third variation in which the gripper 6 is detached and fixation to somewhere is performed).

Therefore, in the embodiment, a detector (not illustrated) is provided. The detector detects whether the gripper 6 is attached to or detached from the second engagement portion 5. A physical switch for detecting whether the gripper 6 is attached to or detached from the second engagement portion 5, for example, may be used as the detector. Furthermore, an optical sensor and a magnetic sensor for detecting whether the gripper 6 is attached to or detached from the second engagement portion 5 may be used as the detector. A controller functions as a radio wave intensity controller. When these detectors detect that the gripper 6 is attached to the second engagement portion 5, the controller increases the intensity of a radio wave transmitted from an antenna. When these detectors detect that the gripper 6 is detached from the second engagement portion 5, the controller decreases the intensity of a radio wave transmitted from the antenna.

Note that the controller includes a central processing unit (CPU), a read only memory (ROM), a random access memory (RAM), a memory unit, and the like as hardware configurations. The ROM and the memory unit store a program for causing the controller to function as the radio wave intensity controller.

In the embodiment as described above, when the gripper 6 is attached to the second engagement portion 5, the intensity of a radio wave transmitted from an antenna can be increased, so that a radio wave can be emitted relatively far away, and tag information can be received from a product located relatively far away. Furthermore, in the embodiment as described above, when the gripper 6 is detached from the second engagement portion 5, the intensity of a radio wave transmitted from the antenna can be decreased, so that tag information can be received from a product located relatively nearby. In this case, tag information is not received from a product located relatively far away.

As described above, the wireless tag reading device 1 according to the embodiment includes the reader 2, the first engagement portion 3, and the handle portion 4. The reader 2 receives information of a wireless tag. The first engagement portion 3 is provided in the reader 2. The handle portion 4 is detachable from the first engagement portion 3.

In the wireless tag reading device 1 of the embodiment as described above, the handle portion 4 is detachable from the first engagement portion 3. Therefore, the wireless tag reading device 1 can be used for various applications.

Although the embodiment of the present invention has been described above, the embodiment is presented as an example, and is not intended to limit the scope of the invention. The embodiment can be implemented in various other forms, and various omissions, substitutions, and changes can be made without departing from the gist of the invention. The embodiment and variations thereof are included in the scope and gist of the invention, and included in the invention described in claims and the equivalent scope thereof.

For example, in the embodiment, it has been described that the second engagement portion 5 and the gripper 6 are detachable from the handle portion 4. This is, however, not a limitation. For example, the handle portion 4 may be configured such that the second engagement portion 5 and the gripper 6 are integrated (undetachable).

What is claimed is:

1. A wireless tag reading device comprising:
a reader that receives tag information transmitted from a wireless tag attached to an article;
a first engagement portion provided in the reader; and
a handle portion detachable from the first engagement portion,
wherein the handle portion further includes
a second engagement portion detachable from the first engagement portion, and
a gripper detachable from the second engagement portion.

2. The wireless tag reading device according to claim 1, wherein the second engagement portion is detachable from a fixing member other than the gripper with the gripper being detached from the second engagement portion.

3. The wireless tag reading device according to claim 1, wherein the handle portion is detachable from the first engagement portion by being rotated with respect to the reader.

4. The wireless tag reading device according to claim 1, further comprising a detector that detects whether the gripper is attached to or detached from the second engagement portion.

5. The wireless tag reading device according to claim 4, wherein the reader includes an antenna that transmits a radio wave to the wireless tag and receives the tag information, and
further includes a radio wave intensity controller that increases a radio wave intensity of the radio wave transmitted from the antenna in a case where the detector detects that the gripper is attached to the second engagement portion and that decreases a radio wave intensity of the radio wave transmitted from the antenna in a case where the detector detects that the gripper is detached from the second engagement portion.

\* \* \* \* \*